(12) United States Patent
Ikeda et al.

(10) Patent No.: US 6,222,293 B1
(45) Date of Patent: Apr. 24, 2001

(54) STARTER

(75) Inventors: Hirohide Ikeda; Kouji Yokota; Kensaku Kuroki, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/534,042

(22) Filed: Mar. 24, 2000

(30) Foreign Application Priority Data

Nov. 10, 1999 (JP) .................................................. 11-319939

(51) Int. Cl.⁷ ............................. H02K 7/10; F02N 11/00; F02N 11/10
(52) U.S. Cl. ........................... 310/99; 310/91; 290/38 A; 290/38 C; 74/7 R; 74/7 A; 74/7 E
(58) Field of Search ..................... 310/75 R, 71, 310/99, 92, 88, 83, 87, 80, 91, 67 R; 290/36 R, 38 A, 48, 47, 38 C; 74/7 C, 7 R, 7 B, 7 E

(56) References Cited

U.S. PATENT DOCUMENTS

| 5,197,342 | * | 3/1993 | Nakagawa | 74/7 A |
| 5,199,309 | * | 4/1993 | Isozumi | 74/7 E |
| 5,311,786 | * | 5/1994 | Moribayashi | 74/7 C |
| 5,390,555 | * | 2/1995 | Gotou et al. | 290/38 A |
| 5,746,089 | * | 5/1998 | Morimoto | 74/7 E |

FOREIGN PATENT DOCUMENTS

| 52-74931 | 6/1977 | (JP) | F02N/11/10 |
| 11-131482 | 5/1999 | (JP) | F02N/11/00 |

* cited by examiner

*Primary Examiner*—Tran Nguyen
(74) *Attorney, Agent, or Firm*—Sughrue, Mion, Zinn, Macpeak & Seas, PLLC

(57) ABSTRACT

A starter comprises a fixing member which has a cylindrical portion and rotation stoppers on the outer wall of the cylindrical portion and is fixed to a bracket so that its movement in a circumferential direction is limited by the rotation stoppers, a mating portion is formed by mating the inner surface of the cylindrical portion of the fixing member with the outer surface of the internal gear of the epicyclic gear reduction unit, and the mating portion is set such that the internal gear slides and rotates with respect to the fixing member when rotation torque applied to the starting output shaft exceeds a predetermined value by machining the end surface of the cylindrical portion of a provisional mating portion formed by provisionally mating the inner surface of the cylindrical portion of the fixing member with the outer surface of the internal gear. Therefore, the breakage of elements of the output transmission system of the starter can be prevented.

12 Claims, 18 Drawing Sheets

STARTER

BACKGROUND OF THE INVENTION

1. Field of the Invention

The present invention relates to a starter having an epicyclic gear reduction unit for reducing the rotation of a motor output shaft integrated with an armature and transmitting the reduced rotation to a starting output shaft and, particularly, to an impact absorbing unit for a starter which absorbs impact stress caused by excessive rotation torque on a load side.

2. Description of the Prior Art

FIG. 14 is a partly exploded side view of a starter incorporating an epicyclic gear reduction unit of the prior art and FIG. 15 is a front view showing key parts of the mated internal gear of the epicyclic gear reduction unit in the starter of the prior art.

In FIG. 14 and FIG. 15, the starter comprises a starting motor 3 for generating rotation force, an epicyclic gear reduction unit for reducing the rotation of the motor output shaft 4 of this starting motor 3 and outputting the reduced rotation, an overrunning clutch 7 which is fitted onto the starting output shaft 6 of the epicyclic gear reduction unit 5, a pinion 8 which can slide over the starting output shaft 6 together with this overrunning clutch 7, and an electromagnetic switch 9 for controlling power supply to the starting motor 3 and urging the pinion 8 toward the ring gear 14 of an engine together with the overrunning clutch 7 through a shift lever 10.

This starting motor 3 is formed like a bottomed cylinder and comprises a yoke 11 which also functions as an outer frame and magnetic circuit, a field coil 12 placed on the yoke 11, an armature 13 placed on the inner side of the field coil 12, a rectifier (not shown) attached to the motor output shaft 4 which is the rotation shaft of the armature 13, and a brush (not shown) in sliding contact with the rectifier. A rear bracket 2 is mated with the rear end of the yoke 11 to be connected to the yoke 11 so as to supports the rear end of the motor rotation shaft 4. A front bracket 1 is mated with the front end of the yoke 11 to be connected to the yoke 11.

This epicyclic gear reduction unit 5 comprises a sun gear 15 formed around the front end of the motor rotation shaft 4, a plurality of epicyclic gears 16 which mesh with the sun gear 15 and an internal gear 17 which meshes with the epicyclic gears 16.

As shown in FIG. 15, the internal gear 17 is formed like a bottomed cylinder having a center hole in the center of the bottom portion, rotation stoppers 19 formed on the outer wall and an internal gear portion 18 formed on the inner wall. The internal gear 17 is fixed to the front bracket 1 so that it is open at the rear end (on the armature side). The rotation stoppers 19 are mated with the front bracket 1 to limit the movement in a circumferential direction of the internal gear 17. The rotation stoppers 19 are required to transmit torque required by the engine from the motor rotation shaft 4 to the starting output shaft 6.

A disk-like flange portion 20 is formed at the rear end of the starting output shaft 6 integratedly. A plurality of pins 21 are provided on the rear end surface of the flange portion 20 concentrically at an equal angular pitch. The epicyclic gears 16 are supported by the respective pins 21 rotably. This flange portion 20, namely, the starting output shaft 6 is rotably supported by a bearing 22 fixed in the center hole of the internal gear 17 fixed to the front bracket 1, and the front end portion of the motor output shaft 4 is rotably supported by a bearing 23 fixed to the flange portion 20. Thereby, the plurality of epicyclic gears 16 mesh with the sun gear 15 and the internal gear portion 18 to constitute the epicyclic gear reduction unit 5.

The sun gear 15 rotates together with the motor rotation shaft 4 to transmit the rotation of the motor rotation shaft 4 to each of the epicyclic gears 16. The epicyclic gears 16 revolve round the sun gear 15 by the rotation of the sun gear 15 while they rotate on their own axes. The starting output shaft 6 is rotated by this revolution of the epicyclic gears 16.

The overrunning clutch 7 can move in an axial direction and is fitted onto the starting output shaft 6. The pinion 8 is connected to the front end portion of a sleeve shaft 24 constituting the overrunning clutch 7. A shift lever 10 is installed such that it can rotate on an intermediate fulcrum portion 10a, one end of which is mated with the overrunning clutch 7 and the other end is connected to the plunger (not shown) of the electromagnetic switch 9 installed above the starting motor 3.

A description is subsequently given of the operation of this starter of the prior art constituted as described above.

Before the operation of the starter, the shift lever 10 is first located at a position shown in FIG. 14, the overrunning clutch 7 does not move, and the pinion 8 is not mated with the ring gear 14.

Then, when a key switch (not shown) is closed and the starter is activated, the armature 13 is energized with power supplied from the electromagnetic switch 9 and rotated by the energization force of the field coil 12. The motor output shaft 4 integrated with the armature 13 is rotated by the rotation of the armature 13. The shift lever 10 is driven by the plunger of the electromagnetic switch 9 and turned on the fulcrum portion 10a in the counterclockwise direction of FIG. 14. The overrunning clutch 7 is pressed by the rotation of this shift lever 10 and moves the starting output shaft 6 forward (right direction in FIG. 14) together with the pinion 8, and the pinion 8 is thereby mated with the ring gear 14.

At this point, rotation torque output from the armature 13 is transmitted from the sun gear 15 of the motor output shaft 4 to the epicyclic gears 16. The epicyclic gears 16 rotate on the respective pins 21 between the sun gear 15 and the internal gear portion 18. That is, the epicyclic gears 16 revolve round the sun gear 15 while they rotate on their own axes. The flange portion 20 supporting the epicyclic gears 16 rotates at a speed lower than the rotation speed of the motor output shaft 4 by the revolution of the epicyclic gears 16 and transmits this reduced rotation output to the starting output shaft 6. The starting output shaft 6 rotates the ring gear 14 (crank shaft) through the overrunning clutch 7 and the pinion 8 at a reduced speed.

In this type of starter, the crank shaft which is connected to the starting output shaft 6 to be rotated may stop suddenly, or the starting output shaft 6 being rotated may be connected to the crank shaft suddenly. In this case, excessive rotation torque is applied to the starting output shaft 6 all of a sudden. The rotation torque applied to the starting output shaft 6 is transmitted from the flange portion 20 at one end of the starting output shaft 6 to the epicyclic gears 16, then to the internal gear 17 through the internal gear portion 18 and finally to the motor output shaft 4 through the sun gear 15.

In the above starter of the prior art, as the internal gear 17 and the front bracket 1 are connected to each other by the rotation stoppers 19, impact stress caused by excessive rotation torque on a load side which undergoes a sudden change may be transmitted to the front bracket 1 and the motor output shaft 4 through the epicyclic gear reduction unit 5 and break a fragile portion of each element of the output transmission system of the starter.

SUMMARY OF THE INVENTION

The starter of the present invention comprises a fixing member which has a cylindrical portion and rotation stoppers on the outer wall of the cylindrical portion and is fixed to a bracket so that its movement in a circumferential direction is limited by the rotation stoppers, a mating portion is formed by mating the inner surface of the cylindrical portion of the fixing member with the outer surface of the internal gear of the epicyclic gear reduction unit, and the mating portion is set such that the internal gear slides and rotates with respect to the fixing member when rotation torque applied to the starting output shaft exceeds a predetermined value by machining the end surface of the cylindrical portion of a provisional mating portion formed by provisionally mating the inner surface of the cylindrical portion of the fixing member with the outer surface of the internal gear.

The mating portion is set as described above by machining the outer surface of the cylindrical portion of the provisional mating portion.

The mating portion is set as described above by forming groves in a radial direction in the outer surface of the provisional mating portion.

The starter which has a mating portion set as described above or a mating portion which is set as described above and formed by mating the inner surface of the cylindrical portion with the outer surface of the internal gear of the epicyclical gear reduction unit by such means as shrinkage fitting or press fitting comprises means of preventing deterioration in the performance of the mating portion as an impact absorbing unit.

The above and other objects, features and advantages of the invention will become more apparent from the following description when taken in conjunction with the accompanying drawings.

BRIEF DESCRIPTION OF THE ACCOMPANYING DRAWINGS

FIG. 16 is a partial sectional view of a starter which the present invention is based on.

DETAILED DESCRIPTION OF THE PREFERRED EMBODIMENTS

Figure 14:
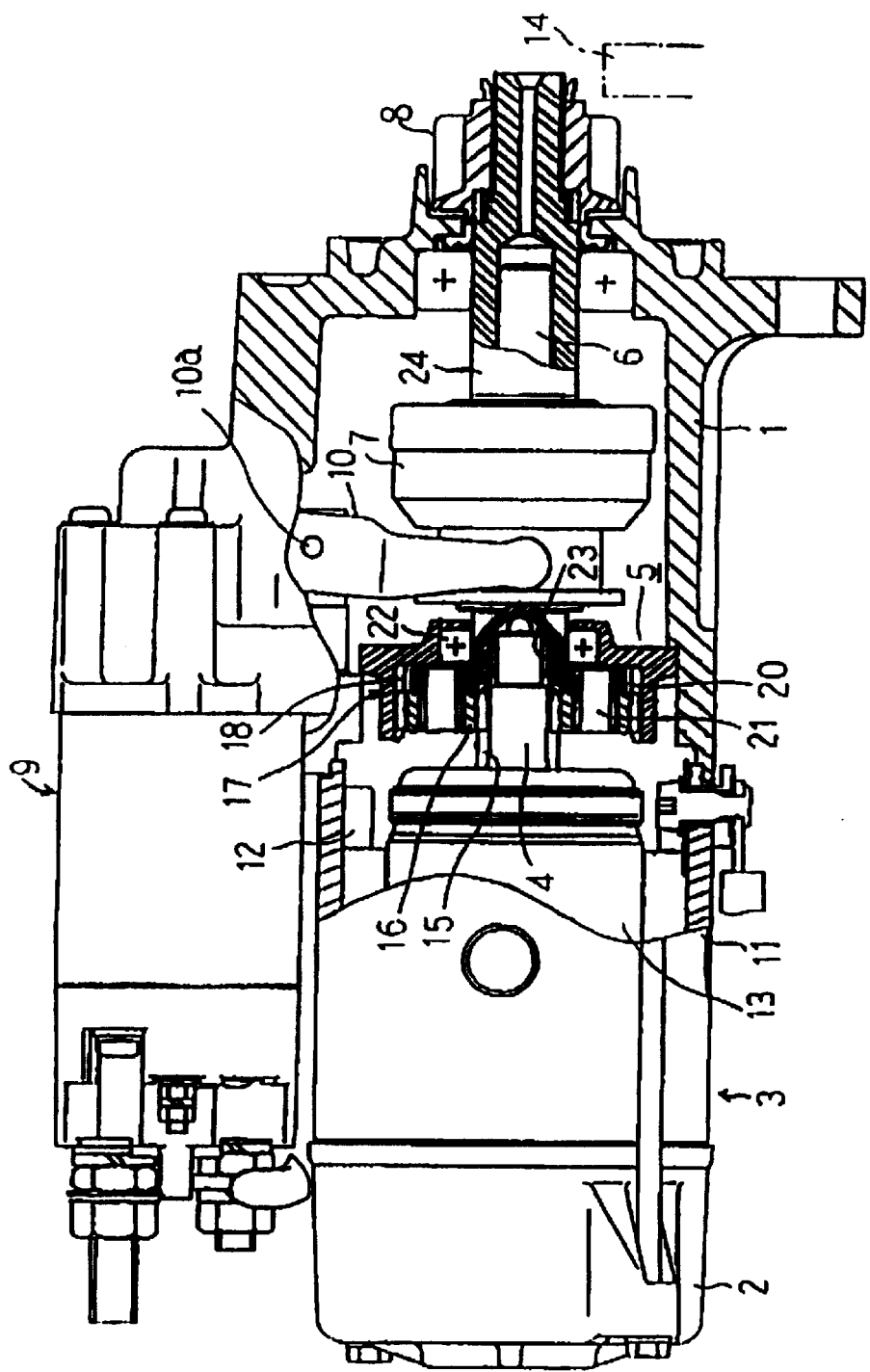
FIG. 14 is a partial sectional view of an example of starter of the prior art.
Figure 15:
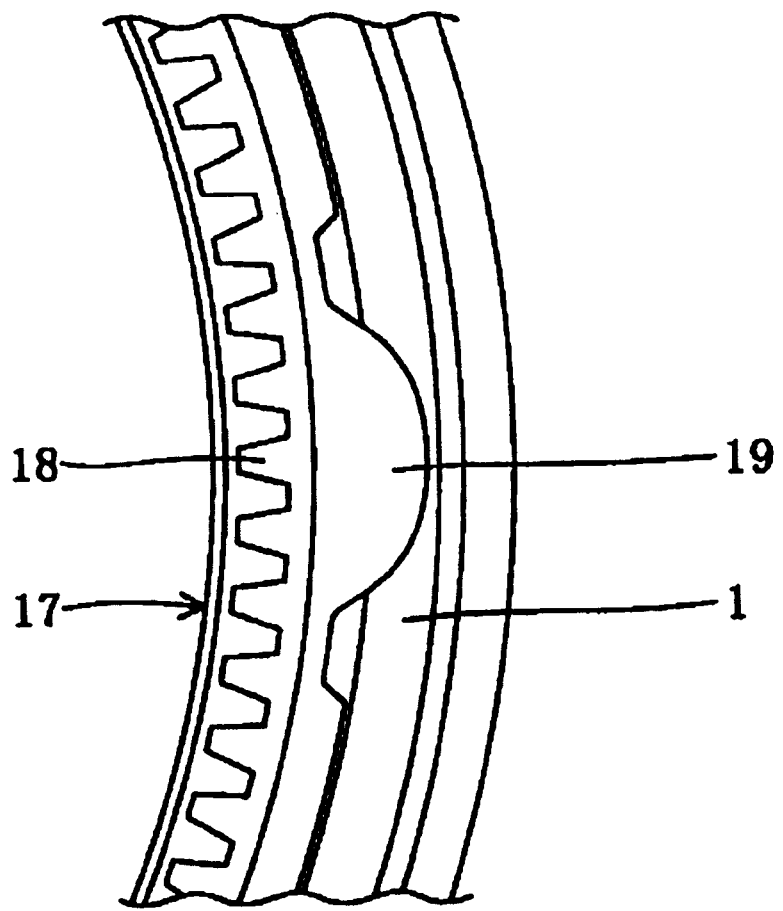
FIG. 15 is a partly enlarged view of the rotation stoppers of the starter.
Figure 16:
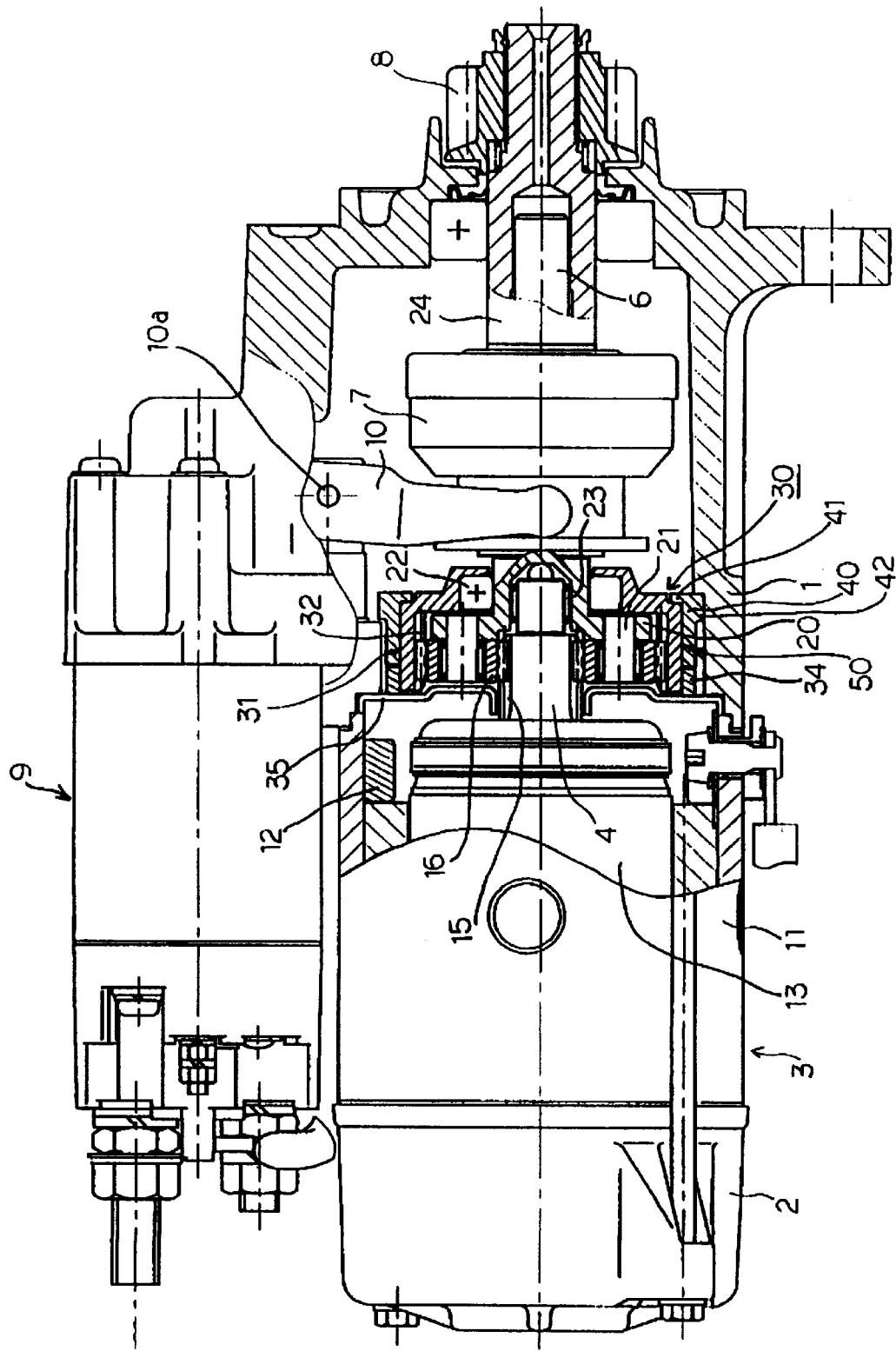
Figure 17:
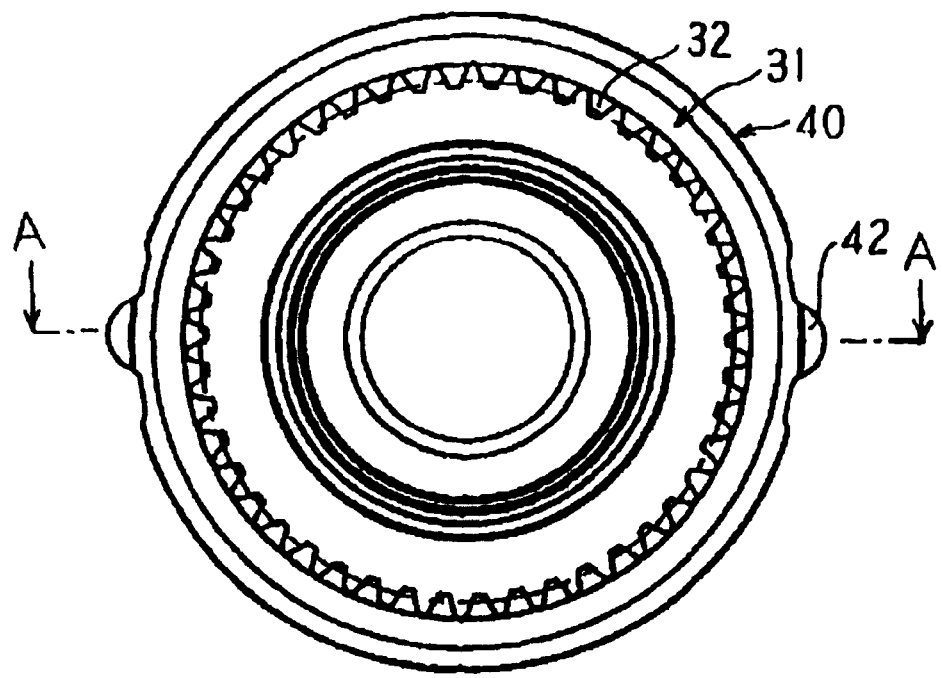
FIG. 17 is a diagram showing mating between the internal gear and the ring of the starter of FIG. 16.
Figure 18:
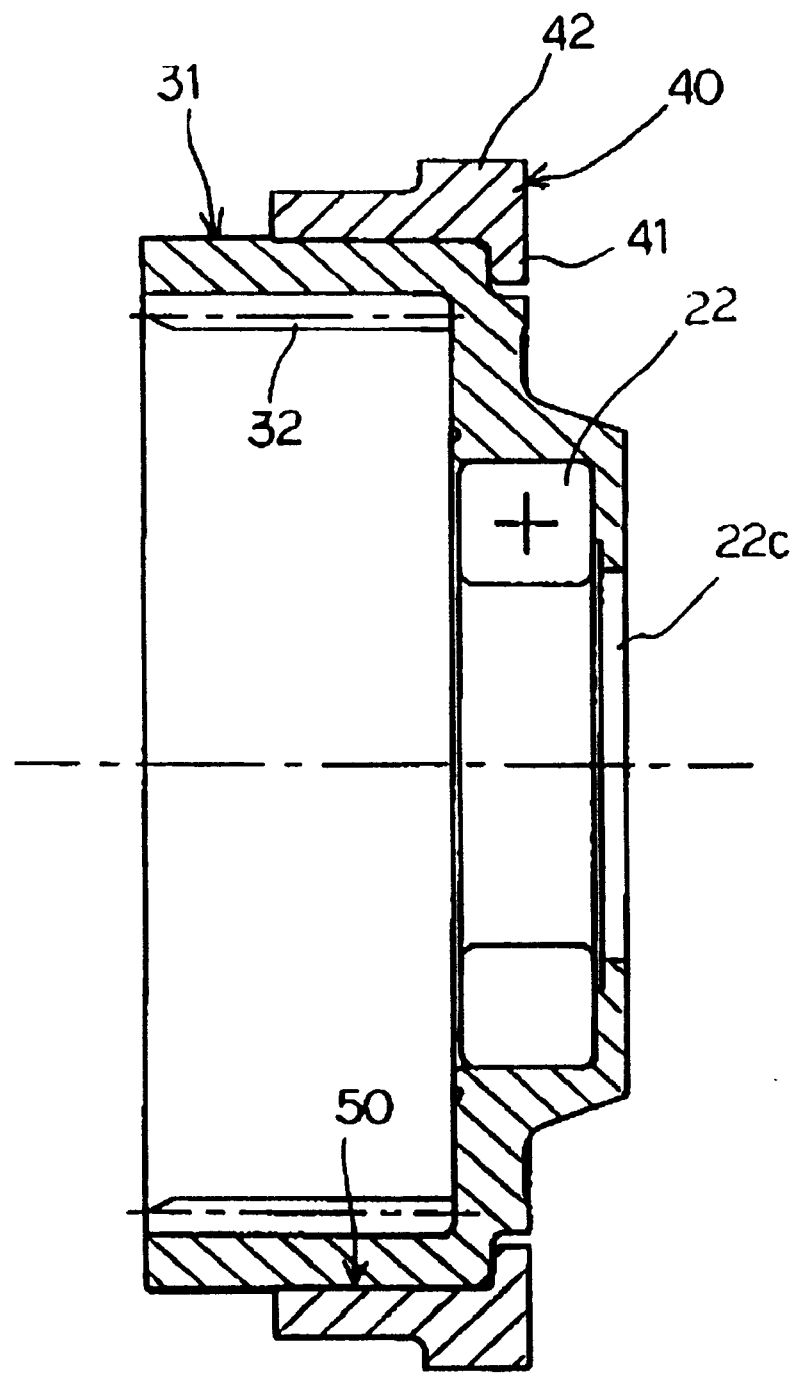
FIG. 18 is a sectional view cut on A—A of FIG. 17.

Before describing preferred embodiments of the present invention, an invention (Japanese Laid-open Patent Application No. 11-131482) which was made by the Applicant of the present invention and the present invention is based on will be described hereinunder with reference to FIGS. 16 to 18. The same elements as those of FIG. 14 and FIG. 15 are given the same reference symbols and their descriptions are omitted.

In the above invention, a ring 40 which is a fixing member for installing an epicyclic gear reduction unit 30 on the front bracket 1 is provided and mated with an internal gear 31 by such means as shrinkage fitting or press fitting to form a mating portion 50 as an impact absorbing unit. This mating portion 50 is set such that the internal gear 31 slides over the ring 40 in a circumferential direction when rotation torque applied to the starting output shaft 6 exceeds a predetermined value. The predetermined sliding torque (the above predetermined torque) of the mating portion 50 is set smaller than a value (upper limit) obtained by dividing the maximum transmission torque of the overrunning clutch 7 by the gear ratio of the internal gear 31 to the sun gear 15 (number of teeth of the internal gear/number of teeth of the sun gear) and larger than or equal to a value (lower limit) obtained by dividing the lock torque of the starter by the gear ratio of the internal gear 31 to the sun gear 15 (number of teeth of the internal gear/number of teeth of the sun gear).

The sliding torque T of the mating portion 50 is obtained from the following equation.

T(N)=P (pressure per unit area (N))×L (length of mating portion)

In the above invention, after the length of the mating portion 50 is predetermined, the machining accuracies of the inner surface of the ring 40 and the outer surface of the internal gear 31 are improved to set interference so as to control P, thereby setting the mating portion 50 such that the internal gear 31 slides and rotates with respect to the ring 40 with torque greater than desired predetermined sliding torque.

The ring 40 is made from a steel material such as SCM415 and formed like a bottomed cylinder having a collar portion 41 formed from one end of the cylinder toward an interior side and rotation stoppers 42 provided on the outer wall. The ring 40 is fixed to the front bracket 1 such that the collar portion 41 faces the front side. The rotation stoppers 42 are mated with the front bracket 1 to limit the movement in a circumferential direction of the ring 40.

The internal gear 31 is made from an iron-based sintered material, for example, and the front end surface of the internal gear 31 contacts the collar portion 41 to limit the movement in an axial direction of the internal gear 31. The internal gear 31 is formed like a bottomed cylinder having a center hole 22c formed in the center of the bottom, a bearing 22 provided in the center of the bottom and an internal gear portion 32 formed on the inner wall.

Denoted by 34 is an annular packing which is fitted on the rear end surface (yoke 11 side) of the internal gear 31. To prevent the epicyclic gears 16 from falling off and charge lubricating oil, a plate 35 is placed between the end surface of the packing 34 and the end surface of the yoke 11.

According to the above invention, when rotation torque greater than the predetermined sliding torque is applied to the starting output shaft 6 and transmitted to the mating portion 50, the internal gear 31 slides and rotates with respect to the ring 40 in the mating portion 50. Therefore, even when the load of the engine increases suddenly and excessive rotation torque is applied to the starting output shaft 6, the excessive rotation torque is absorbed by the mating portion 50 and not transmitted to the front bracket 1 or the motor output shaft 4. As a result, the breakage of elements of the output transmission system of the starter caused by a change in the load of the engine can be prevented.

Since the above predetermined sliding torque is set larger than or equal to the value obtained by dividing the lock torque of the starter by the gear ratio of the internal gear 31 to the sun gear 15, normal rotation operation or speed reduction operation is carried out, thereby making it possible to start the engine without a problem. That is, rotation torque sufficiently large for starting the engine is transmitted from the motor output shaft 4 to the ring gear 14 through the epicyclic gear reduction unit 30 and the overrunning clutch 7, whereby the engine is started and the characteristic properties of the starter can be ensured without fail.

Since the above predetermined sliding torque is set smaller than the value obtained by dividing the maximum transmission torque of the overrunning clutch 7 by the gear ratio of the internal gear 31 to the sun gear 15, when the load of the engine increases suddenly and excessive rotation torque is applied to the starting output shaft 6, the internal gear 31 slides and rotates with respect to the ring 40 before the overrunning clutch 7 slides, thereby preventing the transmission of the excessive rotation torque to the front bracket 1 or the motor output shaft 4 and preventing the breakage of elements of the output transmission system of the starter.

Further, since the collar portion 41 is formed from one end of the ring 40 toward the interior side, the front end surface of the internal gear 31 contacts the collar portion 41, thereby limiting the movement toward the front side in an axial direction of the internal gear 31. Thus, the movement in an axial direction of the epicyclic gear reduction unit 30 is limited, thereby suppressing the displacement in an axial direction of the epicyclic gear reduction unit 30. Therefore, the operation of the epicyclic gear reduction unit 30 for reducing the rotation torque of the motor output shaft 4 and transmitting the reduced rotation torque to the starting output shaft 6 can be carried out stably.

However, in the above invention, after the length of the mating portion 50 is predetermined, P is controlled by setting interference by improving the machining accuracies of the inner surface of the ring 40 and the outer surface of the internal gear 31 to set the mating portion 50 which slides with torque greater than the desired predetermined sliding torque. Therefore, high accuracy is required to machine the inner surface of the ring 40 and the outer surface of the internal gear 31, thereby increasing machining costs. That is, production cost for the manufacture of the mating portion 50 as an impact absorbing unit becomes high.

Preferred embodiments of the present invention will be described hereinunder with reference to the accompanying drawings.

Embodiment 1

Figure 1:
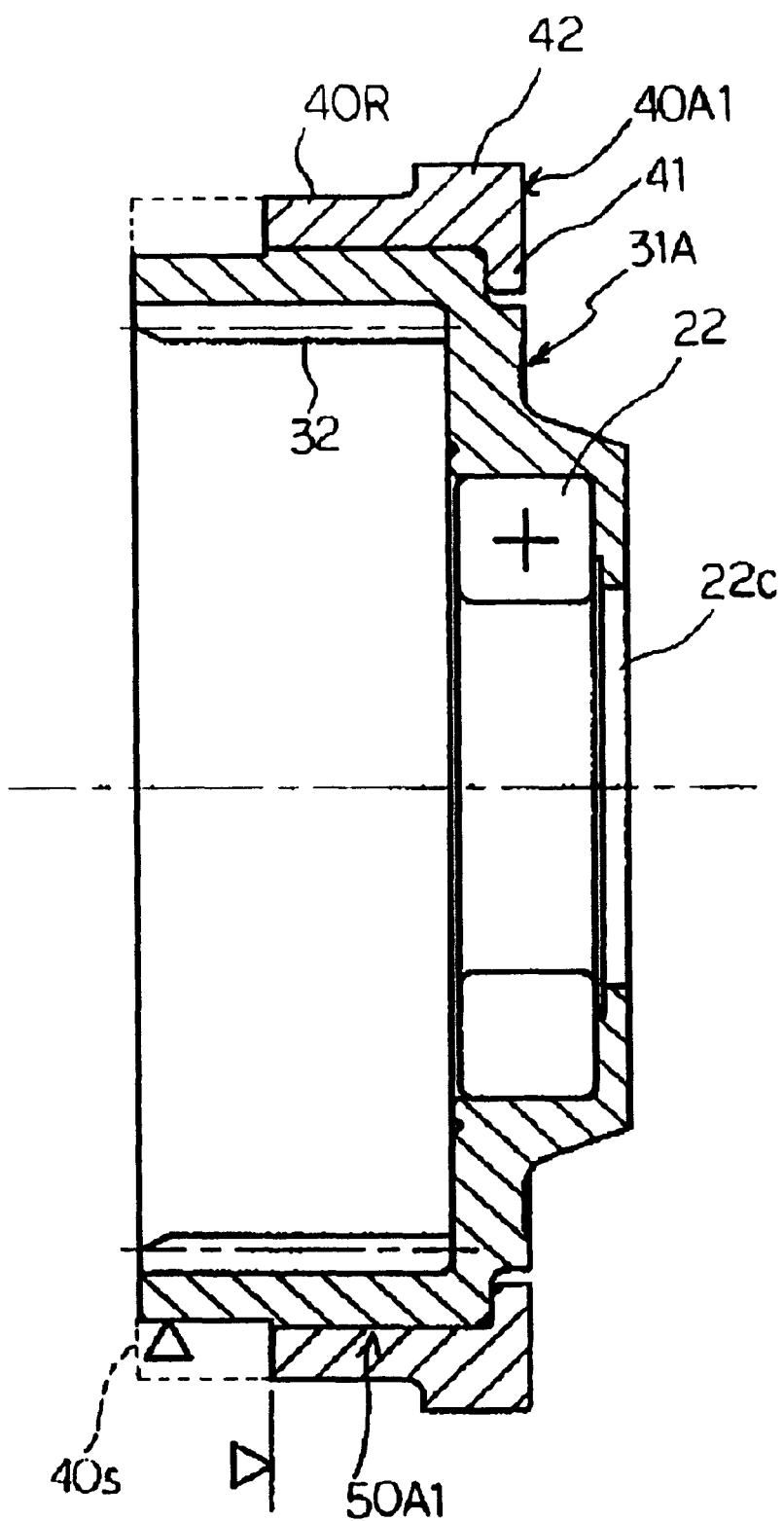
FIG. 1 is a diagram for explaining the mating portion of Embodiment 1 of the present invention.

FIG. 1 is a sectional view of a unit for preventing the breakage of the elements of the output transmission system of a starter according to Embodiment 1 of the present invention. The same elements as those in FIG. 18 are given the same reference symbols.

In FIG. 1, 50A1 denotes a mating portion which is an impact absorbing unit and manufactured through the steps of manufacturing a provisional mating portion consisting of an internal gear 31A and a ring 40A1 which is a fixing member fixed to a front bracket 1, measuring the sliding torque of the provisional mating portion, calculating the length of machining, machining and measuring the sliding torque.

That is, the provisional mating portion in a little strong mating state that the internal gear 31A slides and rotates with sliding torque greater than the above upper limit value is first manufactured. That is, as shown by dotted lines in FIG. 1, the provisional mating portion whose length of mating is set a little long is manufactured and the sliding torque of this provisional mating portion is measured. The mating portion 50A1 whose sliding torque is set smaller than the above upper limit value and larger than the above lower limit value is manufactured in the end. After the length of mating is first set such that the sliding torque becomes larger than the above limit value, the inner surface of the ring 40A1 and the outer surface of the internal gear 31A are roughly machined with appropriate accuracy to set a little strong mating state. That is, above P is set large. In other words, unlike the above invention in which the internal surface of the ring 40 and the outer surface of the internal gear 31 are machined with high accuracy after the length of mating is predetermined, the mating portion 50A1 is manufactured such that the internal gear 31A slides and rotates with respect to the ring 40A1 when torque between the above upper limit value and the above lower limit value is applied to the mating portion by determining the length of mating based on the final determination of the length of machining.

When the upper limit value is 8N and the lower limit value is 6N, for example, the inner surface of the ring 40A1 and the outer surface of the internal gear 31A are first roughly machined with appropriate accuracy so that sliding torque exceeds 8N to set large interference. The sliding torque of the provisional mating portion at this point is measured, and the length of machining is determined to set the sliding torque to a value between 8N and 6N to machine so as to manufacture the mating portion 50A1 whose sliding torque is set to a value between 8N and 6N. The length of machining is the length of the cylindrical portion 40R of the ring 40A1 from the end surface 40s to be machined. Since it is in fact difficult to machine only the ring 40A1 when it is mated, the outer edge of the end surface of the internal gear 31A is slightly machined.

The length of machining is obtained as follows. That is, as T0 is measured by the first measurement and first L0 is known, P is obtained from the equation P=T0/L0. Therefore, L1 for obtaining desired sliding torque T1 is obtained from the equation L1=T1/P. The length of machining is obtained from L0−L1.

The length of machining is obtained from calculation but may be adjusted by measuring the sliding torque of the mating portion each time machining is carried out to obtain the final desired sliding torque.

Once the mating portion is manufactured, the length of machining is determined so that other mating portions can be manufactured in the same manner based on the determined length of machining. Therefore, compared with the above invention in which each mating portion is manufactured by machining the inner surface of the ring 40 and the outer surface of the internal gear 31 with high accuracy, the present invention makes easy machining and reduces machining time and labor, thereby making it possible to greatly cut machining costs.

According to Embodiment 1, the effects of the above invention can be obtained and the production cost of the mating portion 50A1 which is an impact absorbing unit can be reduced.

Embodiment 2

Figure 2:
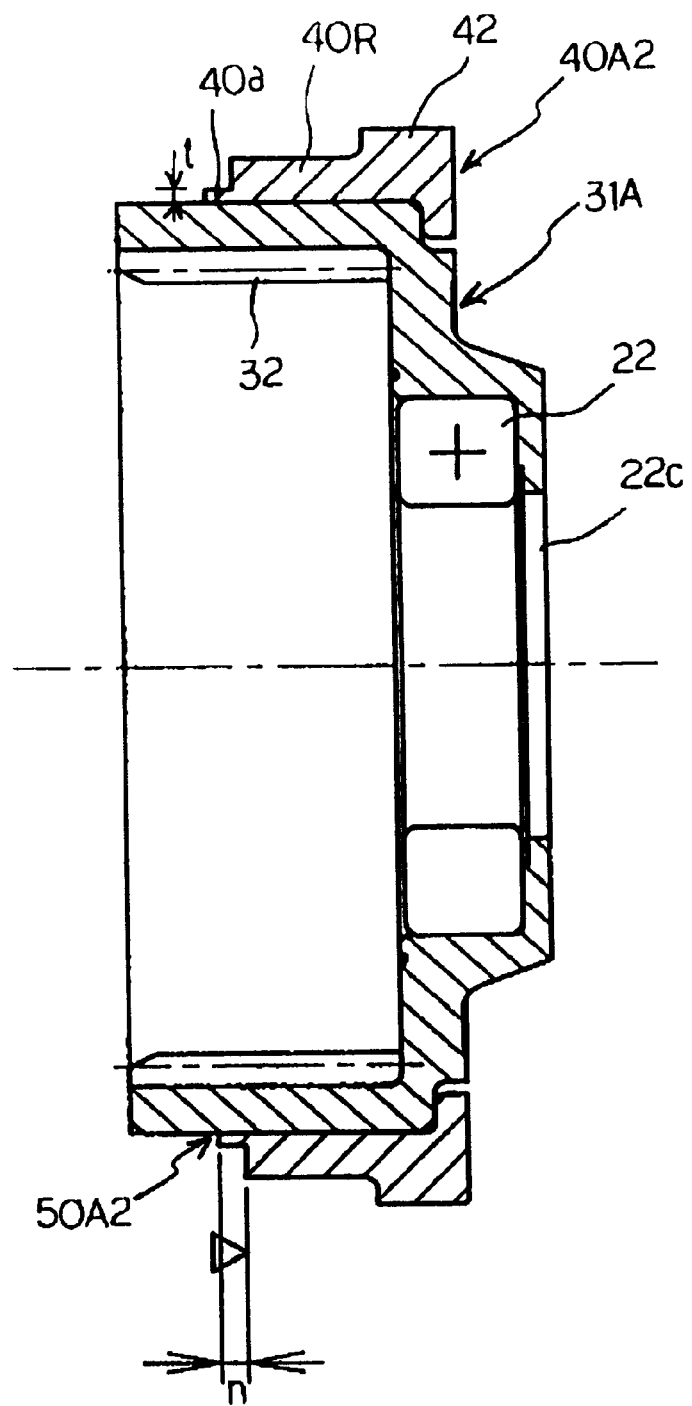
FIG. 2 is a diagram for explaining the mating portion of Embodiment 2 of the present invention.

As shown in FIG. 2, a mating portion 50A2 in which the internal gear 31A slides and rotates with desired sliding torque while a contact area between the internal gear 31A and a ring 40A2 is secured is manufactured. That is, a provisional mating portion is first manufactured in the same manner as in Embodiment 1 and then the mating portion 50A2 is manufactured by machining the outer surface of the cylindrical portion 40R of the ring 40A2 from the end surface side of the ring 40A2 toward the right direction of FIG. 2. In this case, the thickness "t" of the remaining portion 40a of the ring 40A2 after machining is predetermined and the length "n" of machining shown in FIG. 2 is controlled to set the sliding torque of the mating portion 50A2. In the case of this Embodiment 2, as it is difficult to calculate the length of machining, the length of machining is controlled by measuring the sliding torque of the mating portion each time machining is carried out.

According to Embodiment 2, the same effects as those of Embodiment 1 are obtained and the control of torque can be carried out while the contact area between the internal gear 31A and the ring 40A2 of the provisional mating portion can be maintained, thereby improving the durability (baking resistance) of the mating portion, compared with Embodiment 1.

Embodiment 3

Figure 3:
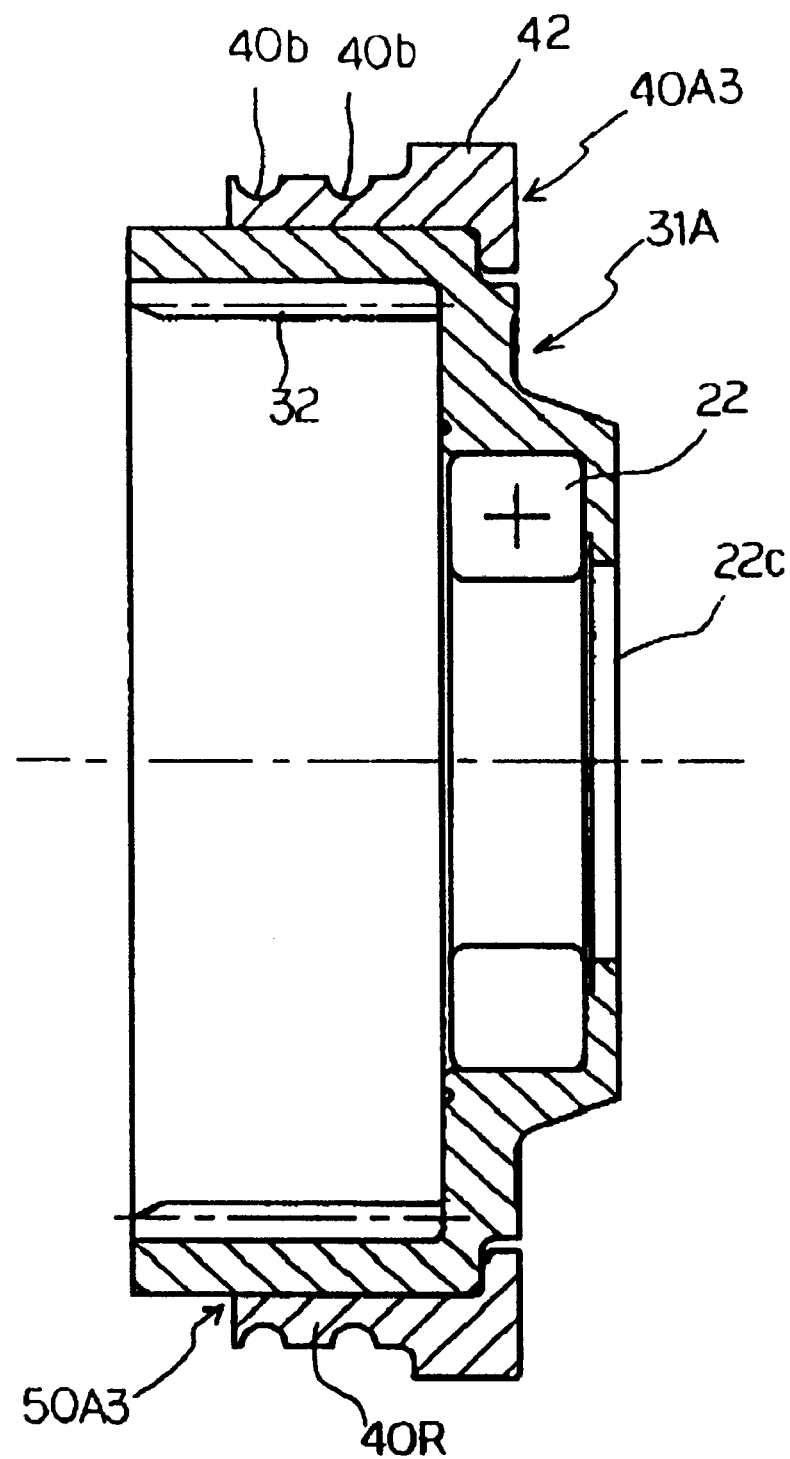
FIG. 3 is a diagram for explaining the mating portion of Embodiment 3 of the present invention.

As shown in FIG. 3, the sliding torque of a mating portion 50A3 may be controlled with the number of grooves 40b which are formed in a radial direction in the outer surface of the cylindrical portion 40R of the ring 40A3 of a provisional mating portion. Also in this case, the sliding torque of the mating portion is measured every time each of the grooves 40 is formed.

That is, desired sliding torque is set by controlling P by forming grooves in the outer surface of the ring 40A3.

According to Embodiment 3, the same effects as those of Embodiment 2 are obtained and machining for the formation of the grooves 40b is easy, thereby making it possible to control sliding torque more easily than Embodiment 2.

Embodiment 4

Figure 4:
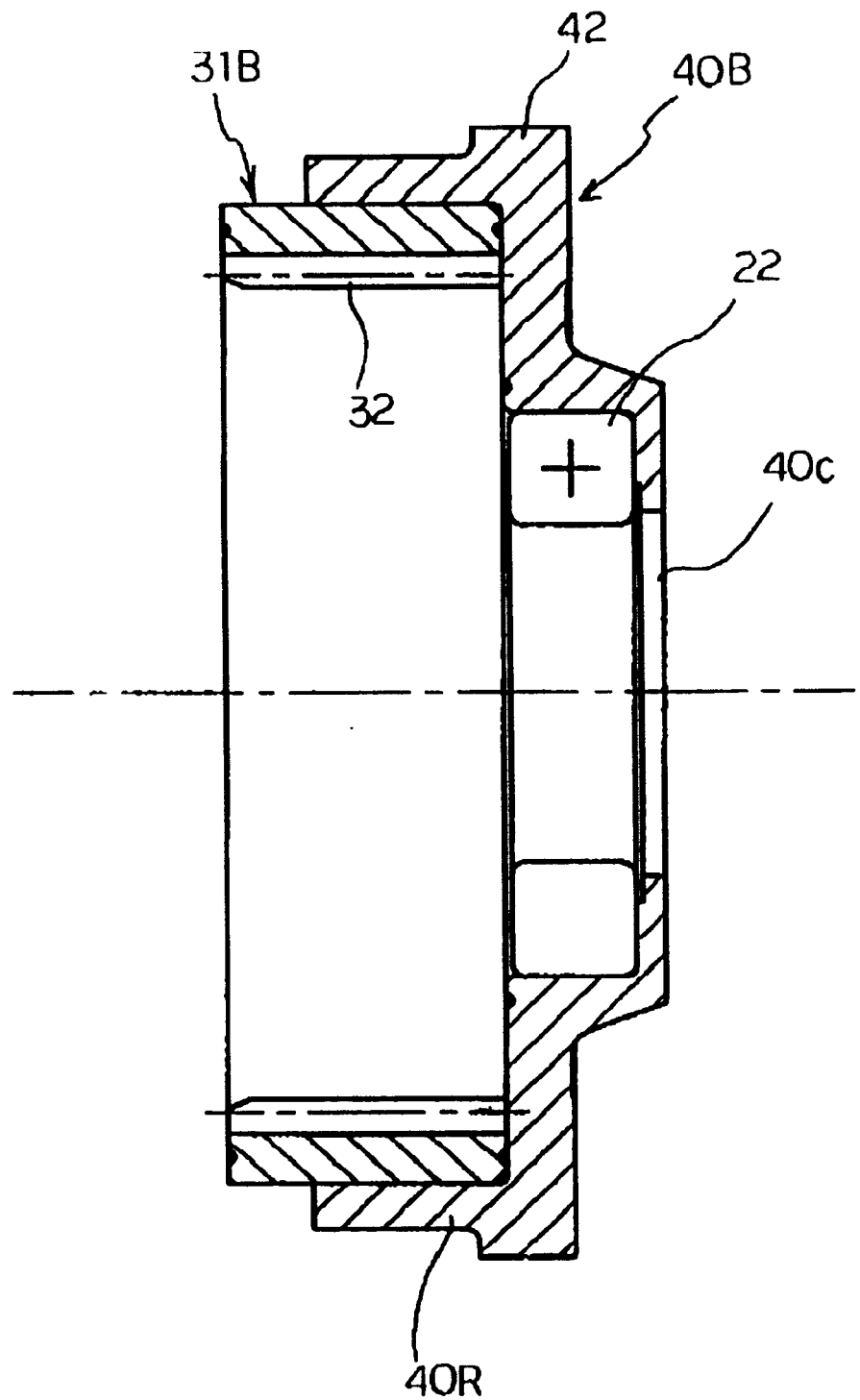
FIG. 4 is a diagram for explaining the mating portion,of Embodiment 3 of the present invention.

As shown in FIG. 4, a cylindrical internal gear 31B which is open at both ends may be used. That is, this cylindrical internal gear 31B may be used to form the mating portions 50A1 to 50A3 and the mating portion 50 of the above invention which makes use of such means as shrinkage fitting or press-fitting.

Since the machining of the internal gear becomes easy, it is possible to cut production cost.

A ring 40B which is a fixing member is formed like a bottomed cylinder having a center hole 40c formed in the center of the bottom, a bearing 22 for rotably supporting the starting output shaft 6 in the bottom, and a cylindrical portion 40R forming the mating portion with the outer surface of the internal gear 31B.

Embodiment 5

Figure 5:
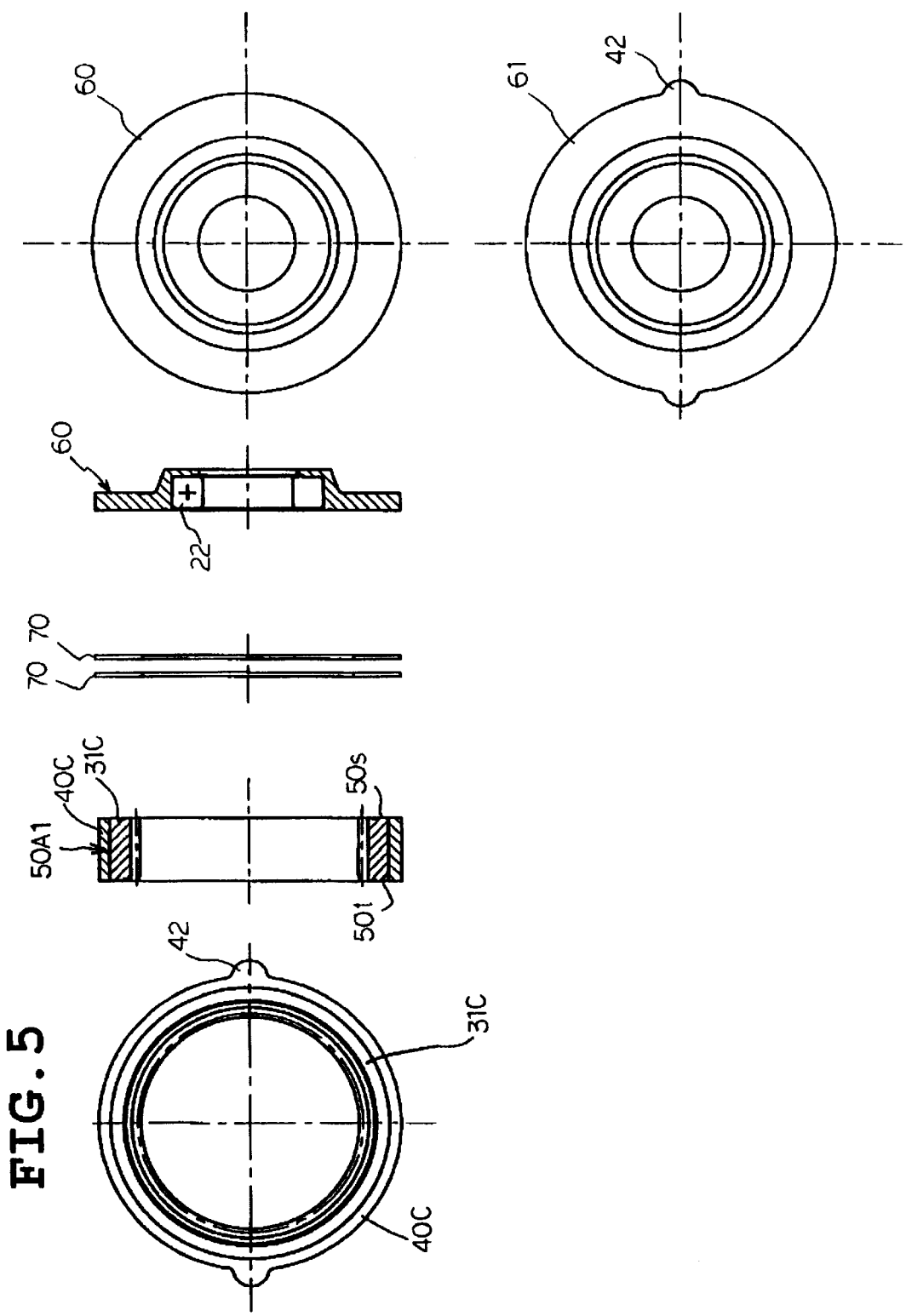
FIG. 5 is a diagram for explaining Embodiment 5 of the present invention.

As shown in FIG. 5, the mating portion 50A1 (or other mating portion 50A2, 50A3 or 50 described above) is formed by a cylindrical internal gear 31C and a ring 40C which is a cylindrical fixing member having the same length as the length in an axial direction of the internal gear 31C and forming the above provisional mating portion when its inner surface is mated with the outer surface of the internal gear 31C while its both ends are aligned with the both ends of the internal gear 31C. A plate 60 which holds a bearing 22 for rotably supporting the starting output shaft 6 may be placed on one end surface 50s of the internal gear 31C, and a control washer 70 may be inserted between the plate 60 and the internal gear 31C to control a space between the plate 60 and the internal gear 31C and a space between the plate 60 and the packing 34 placed on the end surface 50t on the yoke 11 side of the internal gear 31C. The plate 60 has the shape of the ring 40B shown in FIG. 4 excluding the mating portion.

With this constitution, a pressure distribution applied to the mating portion can be made more uniform.

In the above embodiment, as shown in FIG. 5, a plate 61 having rotation stoppers 42 may be used in combination with the ring 40C without rotation stoppers 42.

Embodiment 6

Figure 6:
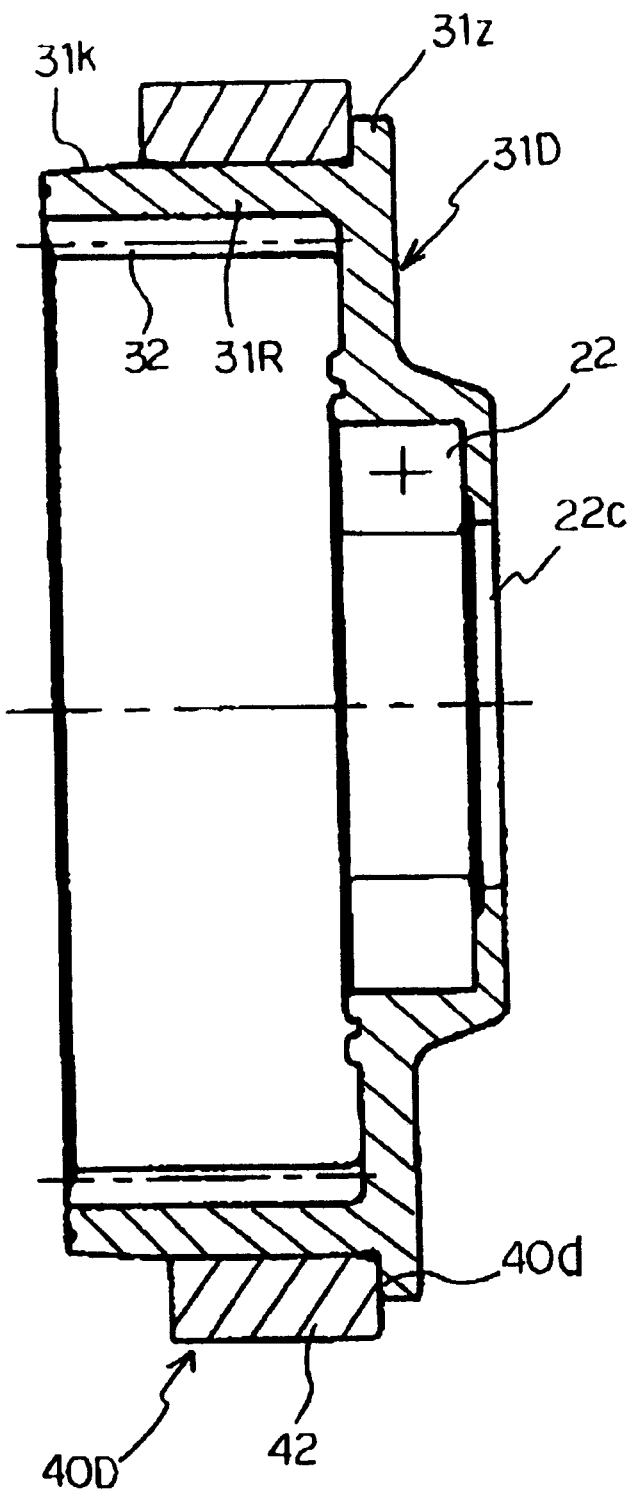
FIG. 6 is a diagram for explaining the mating portion of Embodiment 6 of the present invention.

As shown in FIG. 6, a ring 40D as a cylindrical fixing member which is open at both ends and an internal gear 31D which is formed like a bottomed cylinder having a center hole 22c formed in the center of the bottom, a cylindrical portion 31R mated with the inner surface of the ring 40D, a collar portion 31z mated with one end surface 40d of the ring 40D and formed at the periphery on the bottom side of the cylindrical portion 31R, and a tapered portion 31k inclined toward the center axis of the cylindrical portion 31R and formed on the outer surface on a side opposite to the bottom side of the cylindrical portion 31R are used to constitute the above mating portion 50A1, 50A2, 50A3 or 50.

According to this embodiment, when the internal gear 31D is to be fitted in the ring 40D to manufacture any one of the above mating portions, it is easily fitted because the tapered portion 31k is formed at the end of the internal gear 31D, thereby making easy the manufacture of the mating portion 50. Particularly, in the case of press fitting, this effect is marked. Since the collar portion 31z is provided to limit the movement toward the front side in an axial direction of the internal gear 31D as in the above invention and the other embodiments, the displacement in an axial direction of the epicyclic gear reduction unit is suppressed and the operation of the epicyclic gear reduction unit for reducing the rotation torque of the motor output shaft 4 and transmitting the reduced rotation torque to the starting output shaft 6 can be carried out stably.

Embodiment 7

When grease pools are formed in either one of the contact surfaces of the internal gear and the ring which is a fixing member in any one of the above mating portions 50A1, 50A2, 50A3 and 50 as shown in FIGS. 7 to 12, the internal gear can be slid over the ring smoothly by the lubricating function of the grease under a load of torque greater than a predetermined value, thereby making it possible to stabilize the sliding torque of the mating portion. In the figures, the internal gear 31 and the ring 40 are illustrated.

Figure 7:
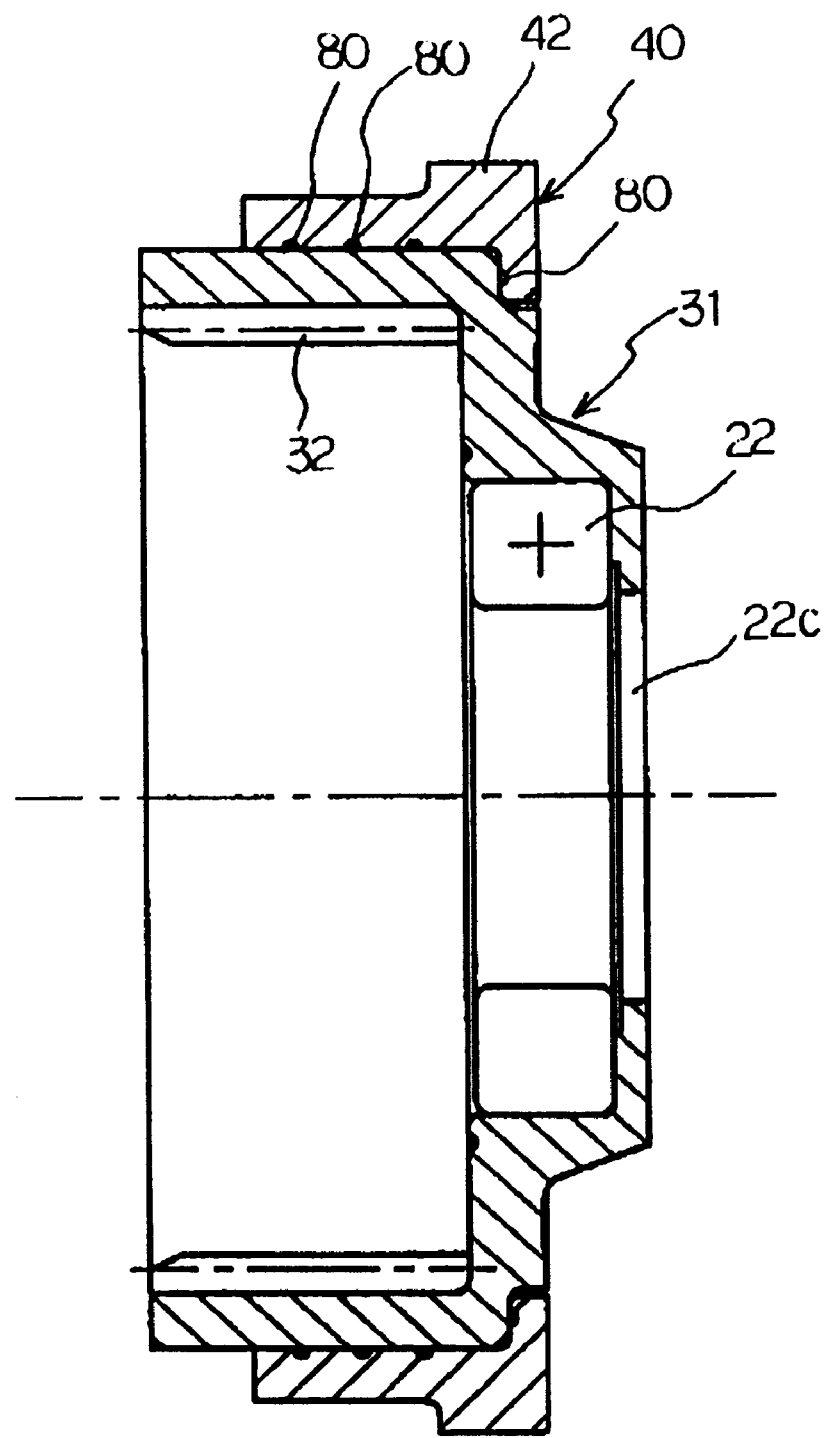
FIG. 7 is a diagram for explaining the mating portion of Embodiment 7 of the present invention.
Figure 8:
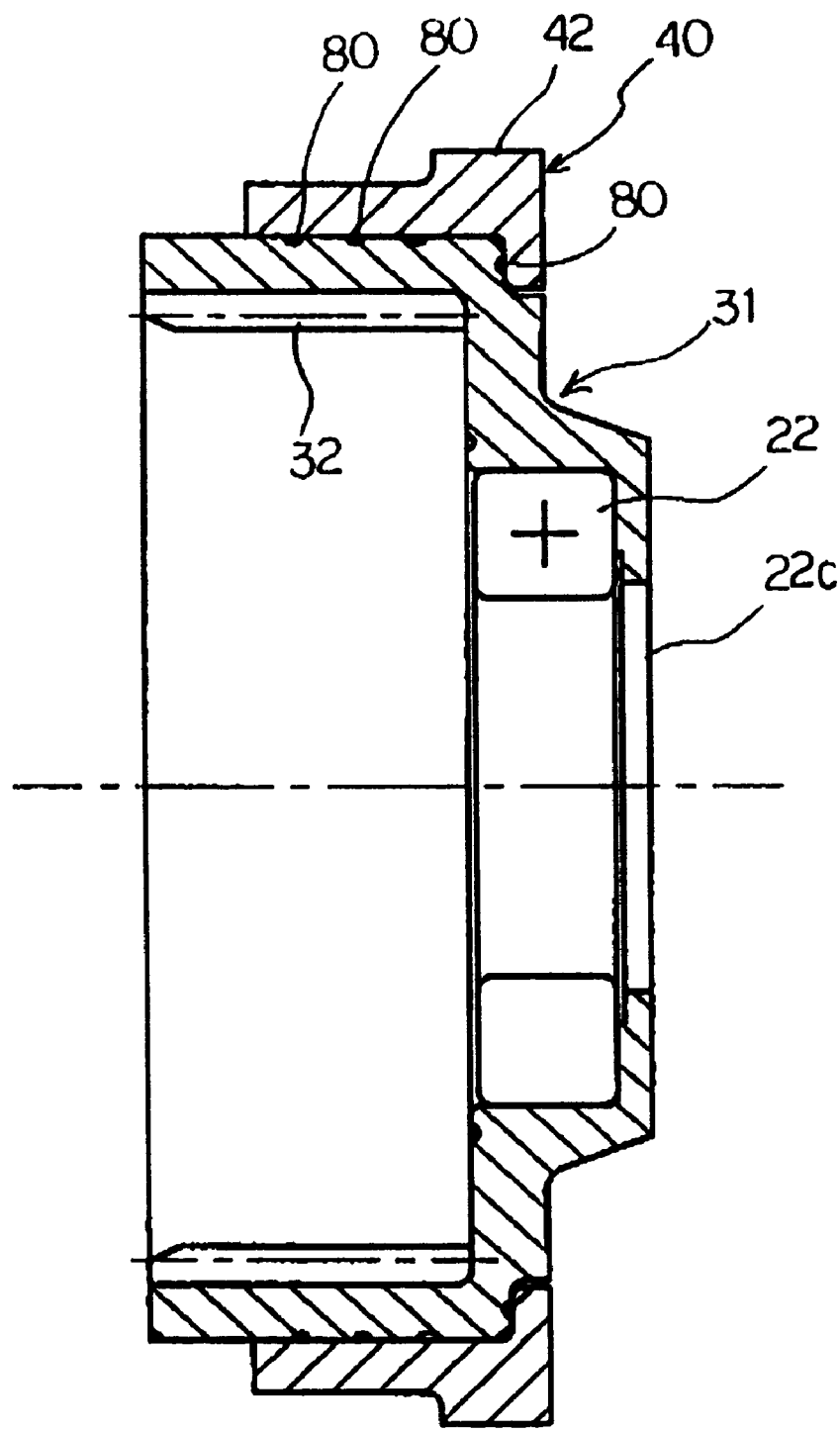
FIG. 8 is a diagram for explaining the mating portion of Embodiment 7 of the present invention.
Figure 9:
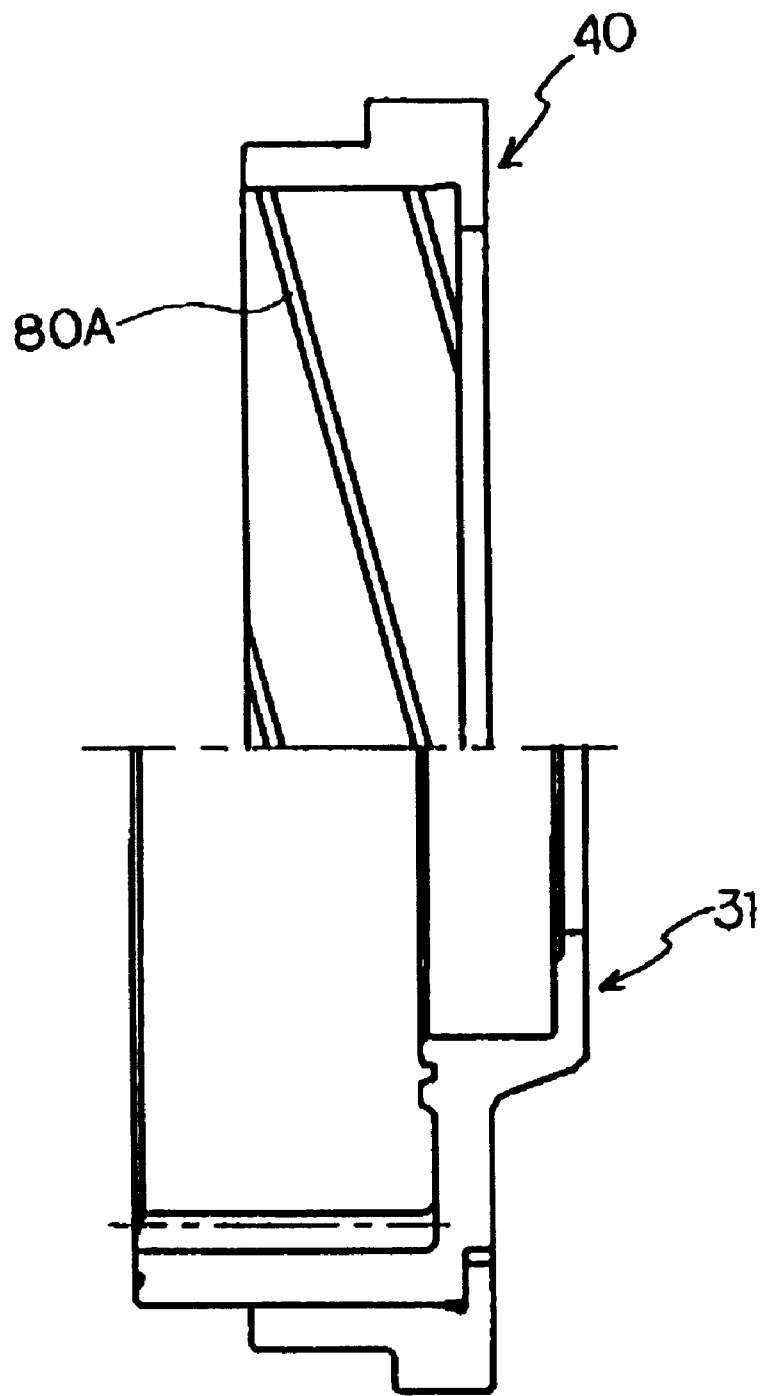
FIG. 9 is a diagram for explaining the mating portion of Embodiment 7 of the present invention.
Figure 10:
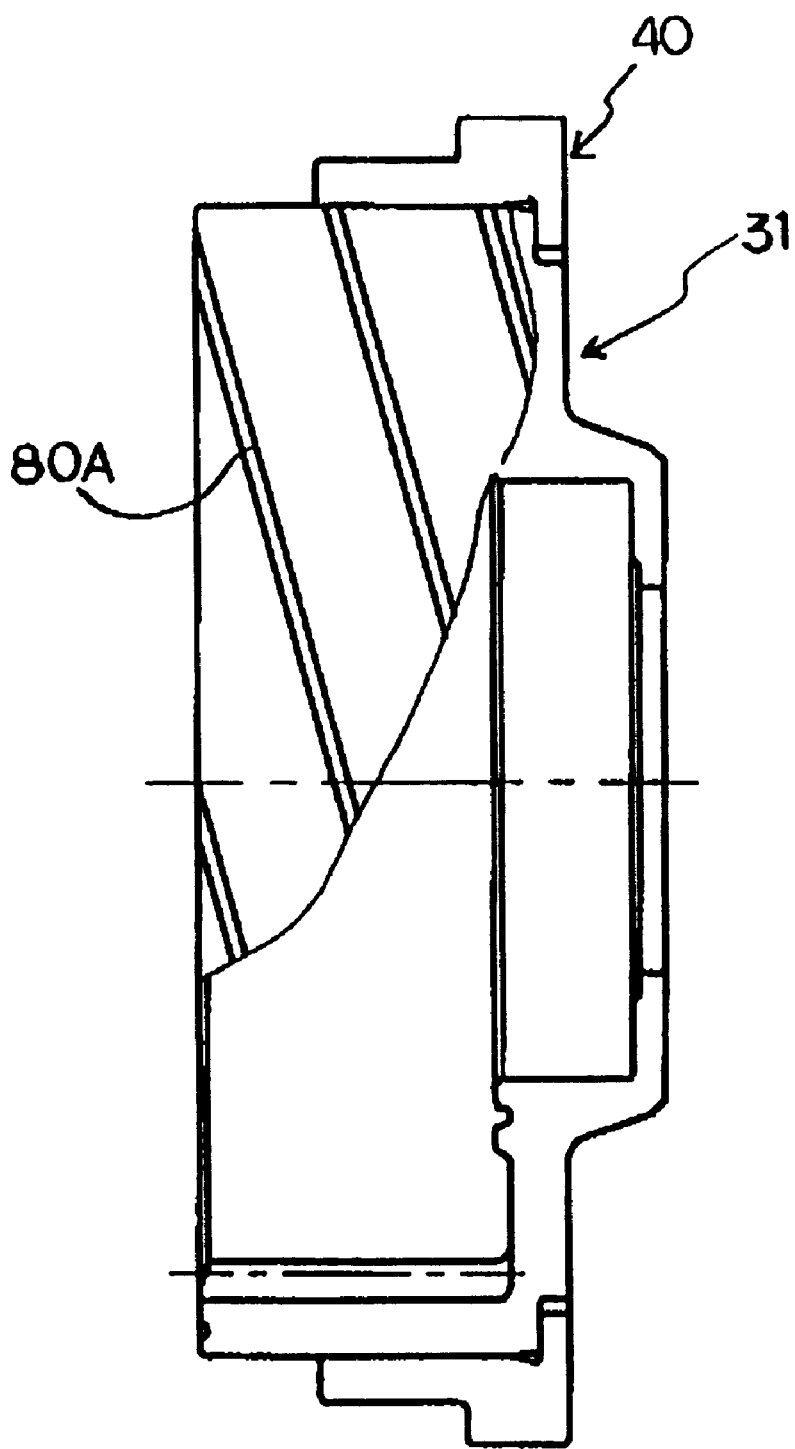
FIG. 10 is a diagram for explaining the mating portion of Embodiment 7 of the present invention.
Figure 11:
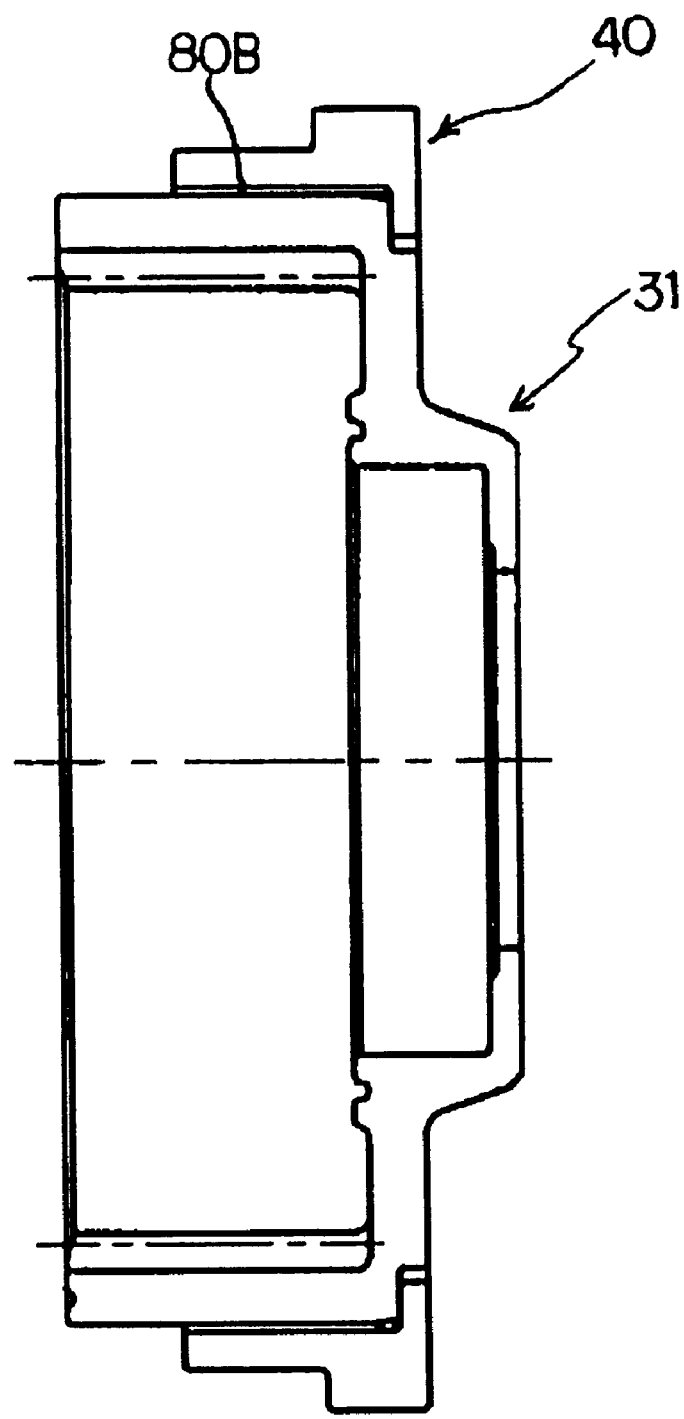
FIG. 11 is a diagram for explaining the mating portion of Embodiment 7 of the present invention.
Figure 12:
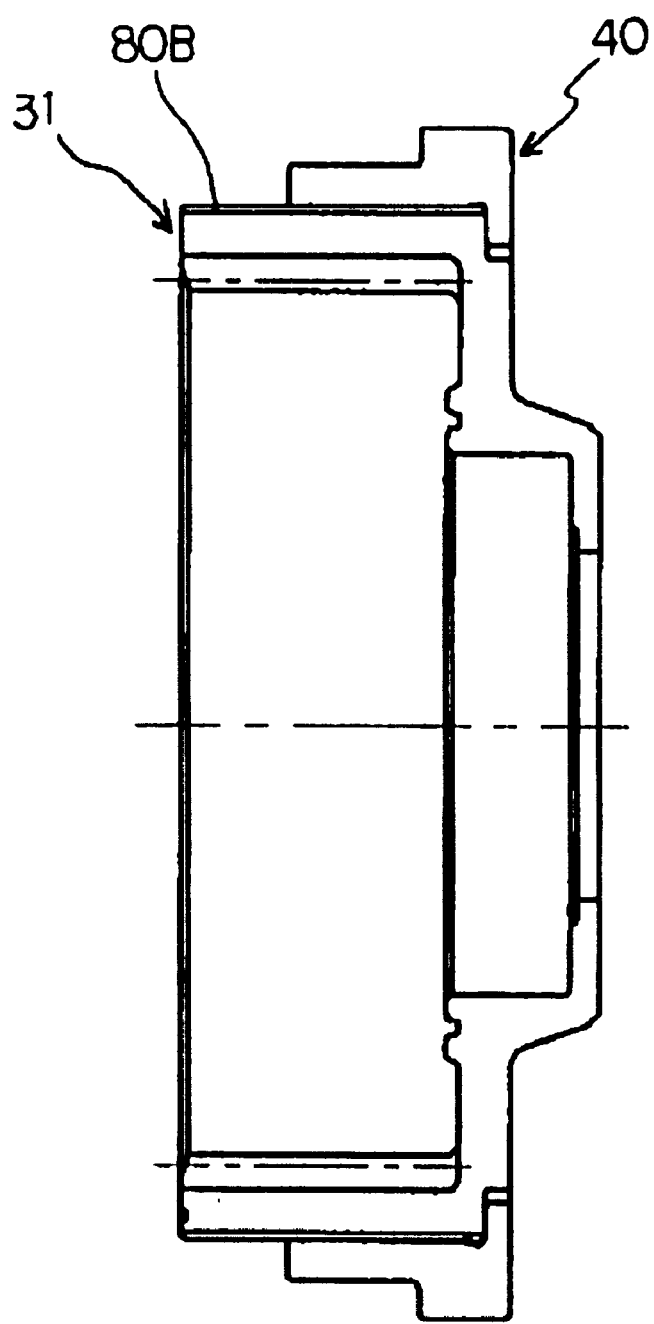
FIG. 12 is a diagram for explaining the mating portion of Embodiment 7 of the present invention.

FIG. 7 shows grease pools which are a plurality of annular grooves formed in the inner surface of the ring 40, FIG. 8 shows grease pools which are a plurality of annular grooves 80 formed in the outer surface of the internal gear 31, FIG. 9 shows a grease pool which is a groove 80a formed spirally in the inner surface of the ring 40, FIG. 10 shows a grease pool which is a groove 80A formed spirally in the outer surface of the internal gear 31, FIG. 11 shows grease pools which are a plurality of grooves 80B extending in an axial direction and formed in the inner surface of the ring 40, and FIG. 12 shows grease pools which are a plurality of grooves 80B extending in an axial direction and formed in the outer surface of the internal gear 31.

Embodiment 8

Figure 13:
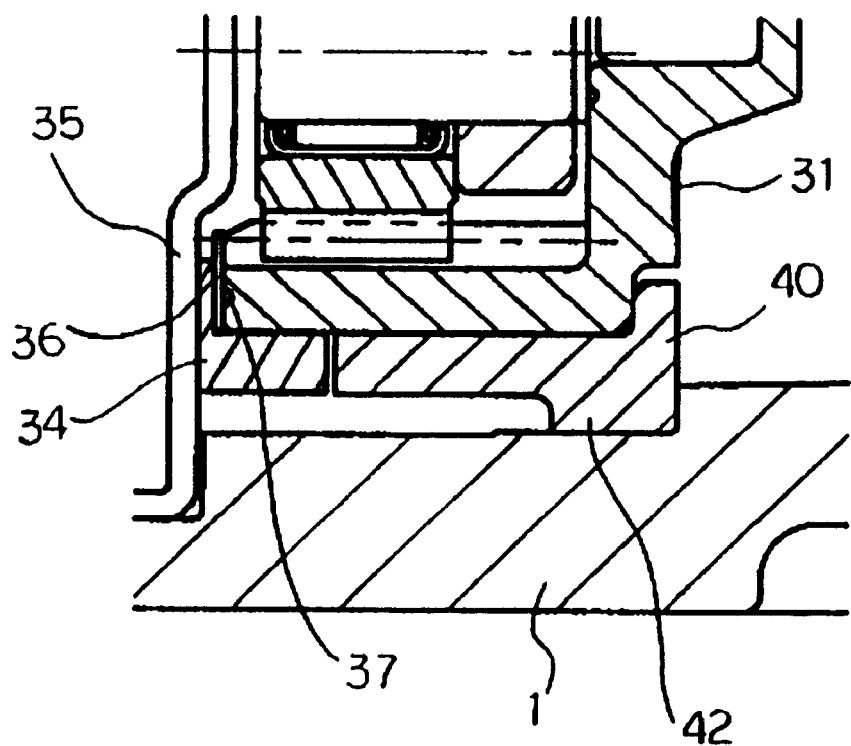
FIG. 13 is a diagram for explaining the mating portion and therearound of Embodiment 8 of the present invention.

As shown in FIG. 13, in any one of the above mating portions 50A1, 50A2, 50A3 and 50, a packing 34 is provided between the end surface on the yoke side of the internal gear 31 and the plate 35, a washer 36 is inserted between the end surface on the yoke side of the internal gear 31 and the packing 34, and a grease groove 37 is formed in the end surface on the yoke side of the internal gear 31.

Friction force between the packing and the internal gear is generally large and causes differences in the sliding toque of the mating portion. Therefore, when the starter is constituted like this embodiment, the internal gear 31 slides over the washer 36 smoothly by the lubricating function of the grease, thereby making it possible to stabilize the sliding torque of the mating portion.

Embodiment 9

The ring which is a fixing member may be formed from a sintered material impregnated with lubricating oil, and the internal gear may be formed from aluminum or iron. In this case, the sliding torque of the mating portion can be stabilized by the ring formed from a sintered material impregnated with lubricating oil.

According to the starter of the present invention, the mating portion formed by mating the inner surface of the cylindrical portion of the fixing member with the outer surface of the internal gear of the epicyclic gear reduction unit is set such that the internal gear slides and rotates with respect to the fixing member when rotation torque applied to the starting output shaft exceeds a predetermined value by machining the end surface of the cylindrical portion of a provisional mating portion formed by mating the inner surface of the cylindrical portion of the fixing member with the outer surface of the internal gear. Therefore, the mating portion absorbs impact stress caused by excessive rotation torque generated by a sudden change in the load of the engine, thereby making it possible to prevent the breakage of elements of the output transmission system and to manufacture the mating portion as an impact absorbing unit at a low cost.

Since the mating portion is set as described above by machining the outer surface of the cylindrical portion of the provisional mating portion, the durability of the fixing member can be improved in addition to the above effects.

Since the mating portion is set as described above by forming grooves in a radial direction in the outer surface of the cylindrical portion of the provisional mating portion, the setting of the mating portion (control of sliding torque) can be carried out with ease.

Since the predetermined torque is set smaller than the value obtained by dividing the maximum transmission torque of the overrunning clutch by the gear ratio of the internal gear to the sun gear of the epicyclical gear reduction unit and larger than or equal to the value obtained by dividing the lock torque of the starter by the gear ratio of the internal gear to the sun gear, the characteristic properties of the starter can be ensured without fail and the breakage of elements of the output transmission system of the starter can be prevented.

In the starter having the mating portion which is set as described above and formed based on the provisional mating portion or the mating portion which is set as described above and formed by mating the inner surface of the cylindrical portion with the outer surface of the internal gear of the epicyclical gear reduction unit by such means as shrinkage fitting or press fitting, the internal gear formed like a cylinder is used to make easy the machining of the internal gear, thereby making it possible to reduce the production cost of the mating portion.

In the starter having any one of the above mating portions, a control washer is used to control the space between the plate and the internal gear and the space between the plate and the packing, thereby making it possible to reduce axial direction force applied to the mating portion and prevent deterioration in the performance of the mating portion.

In the starter having any one of the above mating portions, the cylindrical fixing member and the internal gear having the cylindrical portion whose end is tapered and inclined toward the center axis to be mated with the inner surface of the fixing member and the collar portion to be mated with one end of the fixing member are used to facilitate mating the internal gear with the fixing member. Therefore, the manufacture of the mating portion becomes easy. Further, the operation of the epicyclic gear reduction unit can be stabilized with the collar portion.

In the starter having any one of the above mating portions, since grease pools are formed in either one of the contact surfaces of the internal gear and the fixing member, the sliding torque of the mating portion can be stabilized and deterioration in the performance of the mating portion can be prevented.

In the starter having any one of above the mating portions, since a washer is inserted between the internal gear and the packing and a grease groove is formed in the end surface of the internal gear in contact with the washer, the sliding torque of the mating portion can be stabilized and deterioration in the performance of the mating portion can be prevented.

In the starter having any one of the above mating portions, since the fixing member is formed from a sintered material impregnated with lubricating oil and the internal gear is formed from aluminum or iron, the sliding torque of the mating portion can be stabilized by the ring formed from a sintered material impregnated with lubricating oil.

What is claimed is:

1. A starter comprising:

a starting motor having an armature stored in a yoke;

an epicyclic gear reduction unit for reducing the rotation output of the starting motor and transmitting the reduced rotation output to a starting output shaft;

an overrunning clutch which is fitted onto the starting output shaft in such a manner that its movement in a circumferential direction is limited and it can move in an axial direction;

a pinion which can slide over the starting output shaft in an axial direction together with the overrunning clutch; and an electromagnetic switch for controlling power supply to the starting motor and urging the pinion toward the ring gear of an engine together with the overrunning clutch by a shift lever, wherein the starter further comprises a fixing member which has a cylindrical portion and rotation stoppers on the outer wall of the cylindrical portion and is fixed to a bracket so that its movement in a circumferential direction is limited by the rotation stoppers;

a mating portion is formed by mating the inner surface of the cylindrical portion of the fixing member with the outer surface of the internal gear of the epicyclic gear reduction unit; and the mating portion is set such that the internal gear slides and rotates with respect to the fixing member when rotation torque applied to the starting output shaft exceeds a predetermined value by machining the end surface of the cylindrical portion of a provisional mating portion formed by provisionally mating the inner surface of the cylindrical portion of the fixing member with the outer surface of the internal gear.

2. The starter of claim 1, wherein the predetermined torque is set smaller than a value obtained by dividing the maximum transmission torque of the overrunning clutch by the gear ratio of the internal gear to the sun gear of the epicyclic gear reduction unit (number of teeth of the internal gear/number of teeth of the sun gear) and larger than or equal to a value obtained by dividing the lock torque of the starter by the gear ratio of the internal gear to the sun gear (number of teeth of the internal gear/number of teeth of the sun gear).

3. The starter of claim 1, wherein the internal gear is formed like a cylinder which is open at both ends.

4. The starter of claim 1, wherein the internal gear is formed like a cylinder which is open at both ends, the fixing member is formed like a cylinder which has the same length as the length in an axial direction of the cylindrical internal gear and whose inner surface is mated with the outer surface of the cylindrical internal gear while its both ends are aligned with both ends of the cylindrical internal gear, a plate for rotably supporting the starting output shaft through a bearing is placed on one end surface of the cylindrical internal gear mated with the fixing member, and a control washer is inserted between the plate and the internal gear to control a gap between the plate and the internal gear and a gap between the plate and a packing placed on the other end surface of the internal gear.

5. The starter of claim 4, wherein a cylinder devoid of the rotation stoppers is used in place of the cylindrical fixing member, and a plate having the above rotation stoppers on the outer surface is used in place of the plate.

6. The starter of claim 1, wherein the fixing member is formed like a cylinder which is open at both ends, the internal gear is formed like a bottomed cylinder having a center hole formed in the center of the bottom, a cylindrical portion mated with the inner surface of the cylindrical fixing member and a collar portion mated with one end of the cylinder at the periphery of the bottom portion of the cylindrical portion, and the outer surface on a side opposite to the bottom portion of the cylindrical portion is inclined toward the center axis of the cylindrical portion.

7. The starter of claim 1, wherein grease pools are formed in either one of the contact surfaces of the internal gear and the fixing member.

8. The starter of claim 1, wherein a packing is provided on the yoke side end surface of the internal gear, a washer is inserted between the yoke side end surface of the internal gear and the packing, and a grease pool is formed in the yoke side end surface of the internal gear.

9. The starter of claim 1, wherein the fixing member is formed from a sintered material impregnated with lubricating oil, and the internal gear is formed from aluminum or iron.

10. A starter comprising:

a starting motor having an armature stored in a yoke;

an epicyclical gear reduction unit for reducing the rotation output of the starting motor and transmitting the reduced rotation output to a starting output shaft;

an overrunning clutch which is fitted onto the starting output shaft in such a manner that its movement in a circumferential direction is limited and it can move in an axial direction;

a pinion which can slide over the starting output shaft in an axial direction together with the overrunning clutch; and an electromagnetic switch for controlling power supply to the starting motor and urging the pinion toward the ring gear of an engine together with the overrunning clutch by a shift lever, wherein the starter further comprises a fixing member which has a cylindrical portion and a rotation stopper on the outer wall of the cylindrical portion and is fixed to a bracket so that its movement in a circumferential direction is limited by the rotation stopper;

a mating portion is formed by mating the inner surface of the cylindrical portion of the fixing member with the outer surface of the internal gear of the epicyclic gear reduction unit; and the mating portion is set such that the internal gear slides and rotates with respect to the fixing member when rotation torque applied to the starting output shaft exceeds a predetermined value by machining the outer surface of the cylindrical portion of a provisional mating portion formed by provisionally mating the inner surface of the cylindrical portion of the fixing member is provisionally mated with the outer surface of the internal gear.

11. The starter of claim 10, wherein the mating portion is set as described above by forming grooves in a radial direction in the outer surface of the cylindrical portion of the provisional mating portion.

12. A starter comprising:

a starting motor having an armature stored in a yoke;

an epicyclic gear reduction unit for reducing the rotation output of the starting motor and transmitting the reduced rotation output to a starting output shaft;

an overrunning clutch which is fitted onto the starting output shaft in such a manner that its movement in a circumferential direction is limited and it can move in an axial direction;

a pinion which can slide over the starting output shaft in an axial direction together with the overrunning clutch; and an electromagnetic switch for controlling power supply to the starting motor and urging the pinion toward the ring gear of an engine together with the overrunning clutch by a shift lever, wherein the starter further comprises a fixing member which has a cylindrical portion and rotation stoppers on the outer wall of the cylindrical portion and is fixed to a bracket so that its movement in a circumferential direction is limited by the rotation stoppers;

a mating portion is formed by mating the inner surface of the cylindrical portion of the fixing member with the outer surface of the internal gear of the epicyclic gear reduction unit by such means as shrinkage fitting or press fitting and set such that the internal gear slides and rotates with respect to the fixing member when rotation torque applied to the starting output shaft exceeds a predetermined value; and the internal gear is formed like a cylinder which is open at both ends.

* * * * *